(12) United States Patent
Sombatsiri

(10) Patent No.: US 11,308,045 B2
(45) Date of Patent: Apr. 19, 2022

(54) INFORMATION PROCESSING APPARATUS, CONTROL METHOD, AND PROGRAM

(71) Applicant: NEC Corporation, Tokyo (JP)

(72) Inventor: Salita Sombatsiri, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 16/628,109

(22) PCT Filed: Jul. 4, 2017

(86) PCT No.: PCT/JP2017/024459
§ 371 (c)(1),
(2) Date: Jan. 2, 2020

(87) PCT Pub. No.: WO2019/008661
PCT Pub. Date: Jan. 10, 2019

(65) Prior Publication Data
US 2021/0149852 A1    May 20, 2021

(51) Int. Cl.
*G06F 16/00* (2019.01)
*G06F 16/21* (2019.01)

(52) U.S. Cl.
CPC .................. *G06F 16/212* (2019.01)

(58) Field of Classification Search
CPC ..... G06F 16/212; G06F 17/16; G06N 3/0445; G06N 3/0454
See application file for complete search history.

(56) References Cited

U.S. PATENT DOCUMENTS

| | | | |
|---|---|---|---|
| 2015/0113031 A1 | 4/2015 | Reinwald et al. | |
| 2016/0140374 A1* | 5/2016 | Ye | G06K 7/1473 235/437 |
| 2016/0259826 A1* | 9/2016 | Acar | G06F 16/9535 |
| 2016/0364327 A1* | 12/2016 | Reinwald | G06F 17/16 |
| 2017/0168990 A1* | 6/2017 | Kernert | G06F 17/16 |

FOREIGN PATENT DOCUMENTS

JP    H08-016192 A    1/1996

OTHER PUBLICATIONS

International Search Report for PCT Application No. PCT/JP2017/024459, dated Mar. 15, 2018.
Written opinion for PCT Application No. PCT/JP2017/024459.
(Continued)

*Primary Examiner* — Alexander Khong

(57) ABSTRACT

The information processing apparatus includes an acquisition unit, a sparsity calculation unit, a selection unit, and an output unit. The acquisition unit acquires the input matrix data information. The sparsity calculation unit calculates the sparsity of the target matrix data represented by the input matrix data information. The selection unit selects a representation format to be applied to the output matrix data information from a plurality of representation formats, based on the sparsity calculated by the sparsity calculation unit. The plurality of representation formats include the dense representation format and at least two sparse representation formats. The output unit outputs the output matrix data information that represents the target matrix data in the representation format selected by the selection unit.

9 Claims, 15 Drawing Sheets

(56) References Cited

OTHER PUBLICATIONS

Reginald P. Tewarson, Sparse Matrices, Academic Press Inc, May 1, 1973, New York, USA.
Alex Krizhevsky et al., "ImageNet Classification with Deep Convolutional Neural Networks", The Neural Information Processing Systems Conference, pp. 1097-1105, Dec. 2012, Canada.
Geoffrey Hinton et al., "Deep Neural Networks for Acoustic Modeling in Speech Recognition", IEEE Signal Processing Magazine, vol. 29, Issue 6, pp. 82-97, Oct. 18, 2012. USA.
Alex Graves et al., "Speech Recognition with Deep Recurrent Neural Networks," IEEE International Conference on Acoustics, Speech and Signal Processing 2013, pp. 26-31, May 26-31, 2013, Canada.
Japanese Office Action for JP Application No. 2019-571755 dated Jan. 26, 2021 with English Translation.
Masai et al., "Performance Evaluation of Analysis using N-mode SVD for Questionnaire Data", Japan Society of the eleventh information scientific technology, Japan, General incorporated information processing society, Aug. 21, 2012, pp. 55-60.

\* cited by examiner

Fig. 8

$$A = \begin{pmatrix} 3 & 4 & 9 & 1 & 1 \\ 4 & 5 & 2 & 3 & 4 \\ 5 & 3 & 8 & 1 & 8 \\ 0 & 5 & 5 & 4 & 2 \\ 8 & 7 & 0 & 1 & 1 \end{pmatrix}$$

No. of Zero = 2
Total No. = 25

Sparsity = 2/25 = 0.08

$$B = \begin{pmatrix} 0 & 4 & 9 & 1 & 1 \\ 4 & 5 & 2 & 0 & 4 \\ 5 & 0 & 8 & 1 & 8 \\ 0 & 5 & 5 & 4 & 0 \\ 8 & 7 & 0 & 1 & 1 \end{pmatrix}$$

No. of Zero = 6
Total No. = 25

Sparsity = 6/25 = 0.24

$$C = \begin{pmatrix} 0 & 0 & 0 & 0 & 0 & 0 & 0 \\ 0 & 0 & 0 & 0 & 2 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix}$$

No. of Zero = 48
Total No. = 49

Sparsity = 48/49 = 0.98

Fig. 15

INFORMATION PROCESSING APPARATUS, CONTROL METHOD, AND PROGRAM

This application is a National Stage Entry of PCT/JP2017/024459 filed on Jul. 4, 2017, the contents of all of which are incorporated herein by reference, in their entirety.

TECHNICAL FIELD

The present invention generally relates to data representation.

BACKGROUND ART

Array data has been used to describe many kinds of information. For example, output data from Deep Neural Networks (DNN) can be described with array data.

Matrix data is a type of array data, which is composed of rows and columns. Matrix data is able to be represented in many types of data formats. The data formats used to represent matrix data falls into two main classes: dense representation format and sparse representation format. The dense representation format represents matrix data with all data elements. On the other hand, the sparse representation format represents matrix data with non-zero data elements (data elements the value of which is not zero) and their locations in the matrix. NPL 1 discloses various types of sparse representation format such as compressed sparse row (CSR), compressed sparse column (CSC), a Coordinate list (COO), block sparse row (BSR), list of list (LOL), and etc.

There is no representation format best in common for all matrix data, and which representation format is suitable depends on matrix data to be represented. PTL1 discloses a way of selecting a representation format to be used to represent matrix data. In this document, the sparsity of the matrix data is compared with the threshold in order to choose dense or sparse data representation. The sparsity of matrix data is a value indicating how sparse the matrix is. For example, the sparsity of matrix data is defined by the ratio of the number of zero-valued data elements to the total number of data elements in the matrix data. When it is determined to use sparse representation based on the sparsity of the matrix data, either of CSC and CSR are further chosen based on the number of rows and columns of the matrix data.

CITATION LIST

Patent Literature

[PTL1] US Patent Application Publication No. US 2016/0364327 A1

Non-Patent Literature

[NPL1] Reginald P. Tewarson, "Sparse Matrices", ACADEMIC PRESS INC, May 1, 1973
[NPL2] Alex Krizhevsky et al., "ImageNet Classification with Deep Convolutional Neural Networks", THE NEURAL INFORMATION PROCESSING SYSTEMS CONFERENCE, pp. 1097-1105, Decempber, 2012
[NPL3] Geoffrey Hinton et al., "Deep Neural Networks for Acoustic Modeling in Speech Recognition", IEEE SIGNAL PROCESSING MAGAZINE, VOL 29, ISSUE 6, pp. 82-97, Oct. 18, 2012
[NPL4] Alex Graves et al., "Speech Recognition with Deep Recurrent Neural Networks," IEEE International Conference on Acoustics, Speech and Signal Processing 2013, pp. 26-31, May 26-31, 2013

SUMMARY OF INVENTION

Technical Problem

The technique disclosed by PTL1 uses the sparsity of the matrix data in order to merely distinguish high sparsity and low sparsity of matrix data, and determine whether to use dense or sparse representation format. Therefore, this technique is not effective for matrix data with moderate sparsity. An object of the present invention is to provide a technique capable of effectively determining suitable representation format even for matrix data with moderate sparsity.

Solution to Problem

The present invention provides an information processing apparatus comprising: an acquiring unit acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format; a sparsity calculation unit calculating sparsity of the target matrix data; a selection unit selecting one of a plurality of representation formats based on the calculated sparsity, the plurality of representation formats including the dense representation format and at least two types of sparse representation formats; and an output unit outputting output matrix data information in which the target matrix data is represented by in the selected representation format.

The present invention provides a control method to be performed by a computer. The control method comprises: acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format; calculating sparsity of the target matrix data; selecting one of a plurality of representation formats based on the calculated sparsity, the plurality of representation formats including the dense representation format and at least two types of sparse representation formats; and outputting output matrix data information in which the target matrix data is represented by in the selected representation format.

The present invention provides a program causing a computer executes: acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format; calculating sparsity of the target matrix data; selecting one of a plurality of representation formats based on the calculated sparsity, the plurality of representation formats including the dense representation format and at least two types of sparse representation formats; and outputting output matrix data information in which the target matrix data is represented by in the selected representation format.

Advantageous Effects of Invention

According to the present invention, it is provided that a technique capable of determining suitable representation format even for matrix data with moderate sparsity.

BRIEF DESCRIPTION OF DRAWINGS

The above-mentioned objects, other objects, features and advantages will be made clearer from the preferred example embodiments described below, and the following accompanying drawings.

FIG. 8 illustrates three examples of matrix data.

FIG. 15 illustrates how the conversion unit 2100 works when 1D array data is input.

DESCRIPTION OF EMBODIMENTS

Example embodiments of the present invention are described in detail below referring to the accompanying drawings. Note that, in block diagrams, each block represents a function-based configuration instead of a hardware-based configuration.

First Example Embodiment

Figure 1:
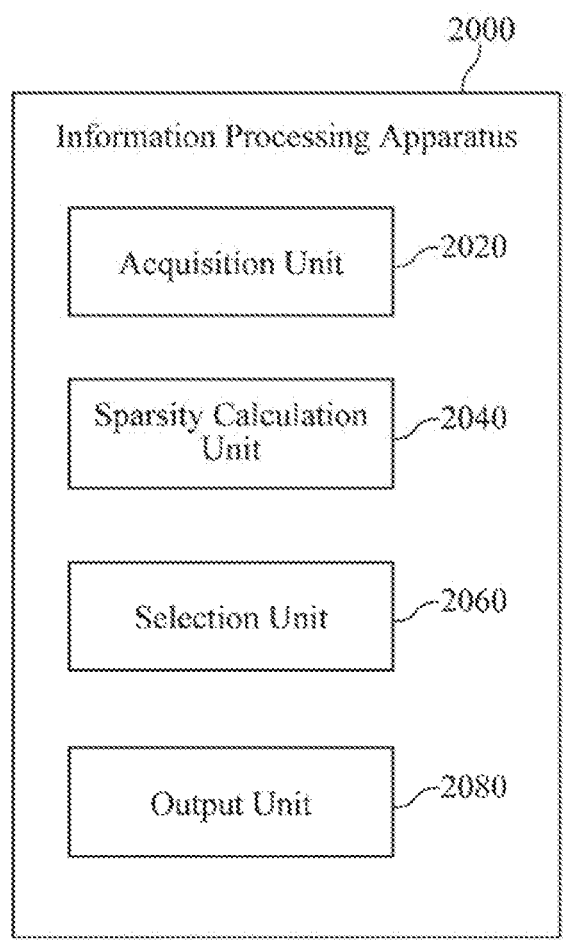
FIG. 1 illustrates an information processing apparatus of the first example embodiment.

FIG. 1 illustrates an information processing apparatus 2000 of the first example embodiment. The information processing apparatus 2000 handles matrix data information, which represents matrix data in one of a plurality of representation formats. Hereinafter, the matrix data represented by the matrix data information is called "target matrix data".

Figure 2:
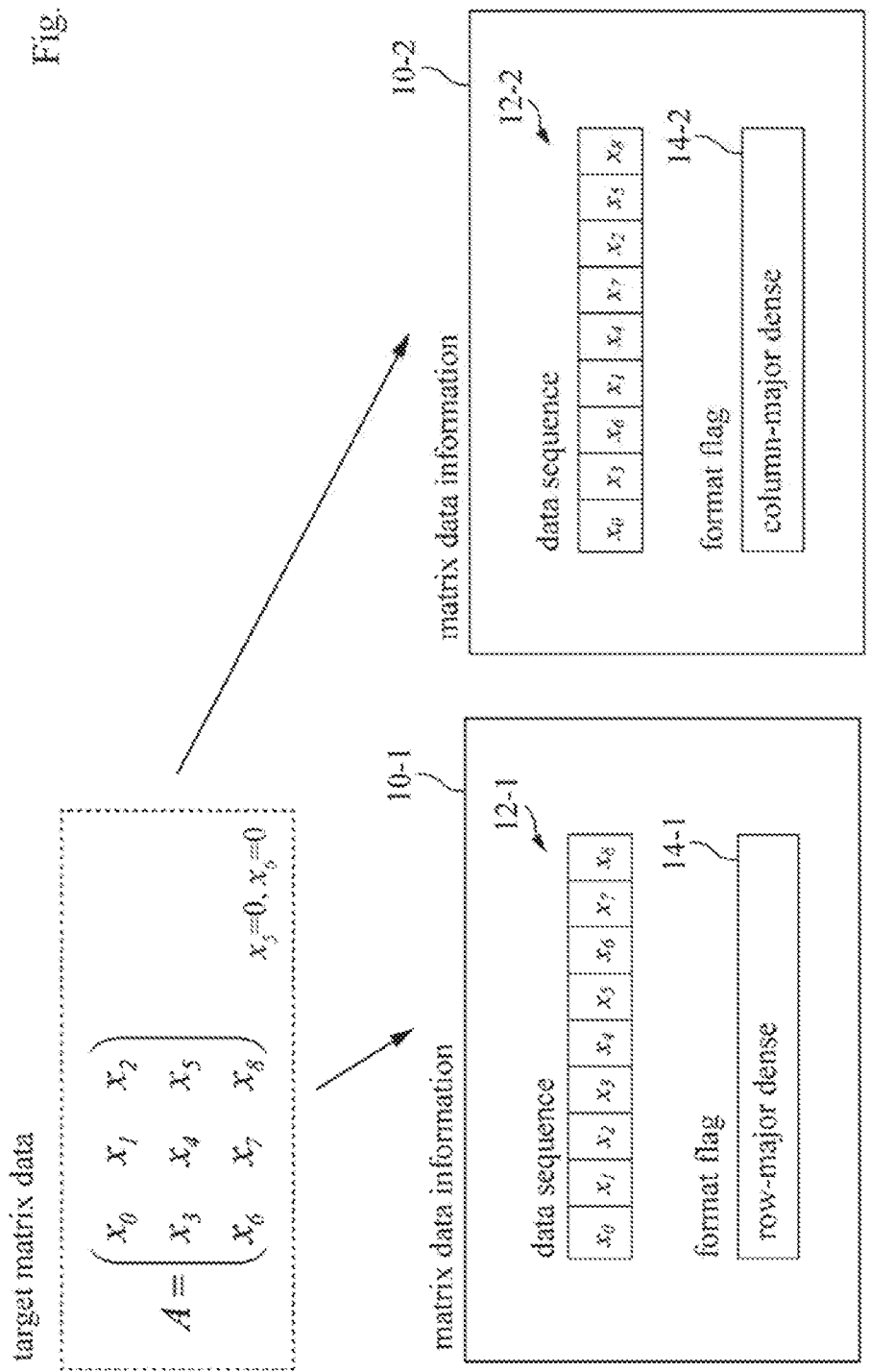
FIG. 2 illustrates examples of the matrix data information representing the target matrix in the dense representation format.

The plurality of representation formats include the dense representation format and at least two sparse representation formats. When representing the target matrix data in the dense representation format, the matrix data information may include all data elements of the target matrix data in either row-major order or column-major order. FIG. 2 illustrates examples of the matrix data information representing the target matrix in the dense representation format. In FIG. 2, the matrix data information 10-1 includes a data sequence 12-1 that indicates all data elements of the target matrix data in row-major order, and a format flag 14-1 that indicates the representation format used in the matrix data information 10. The format flag 14 indicates that the row-major dense representation format is used. On the other hand, the matrix data information 10-2 includes the data sequence 12-2 that indicates all data elements of the target matrix data in column-major order. The format flag 14-2 indicates that the column-major dense representation format is used.

When representing the matrix data in a sparse representation format, the matrix data information does not include at least one of all data elements. For example, the matrix data information in a sparse representation format includes non-zero data elements and location information. The location information is information that can be used to determine locations of each non-zero data elements. For example, the location information includes indices of each non-zero data elements or those of each zero-valued data elements.

Figure 3:
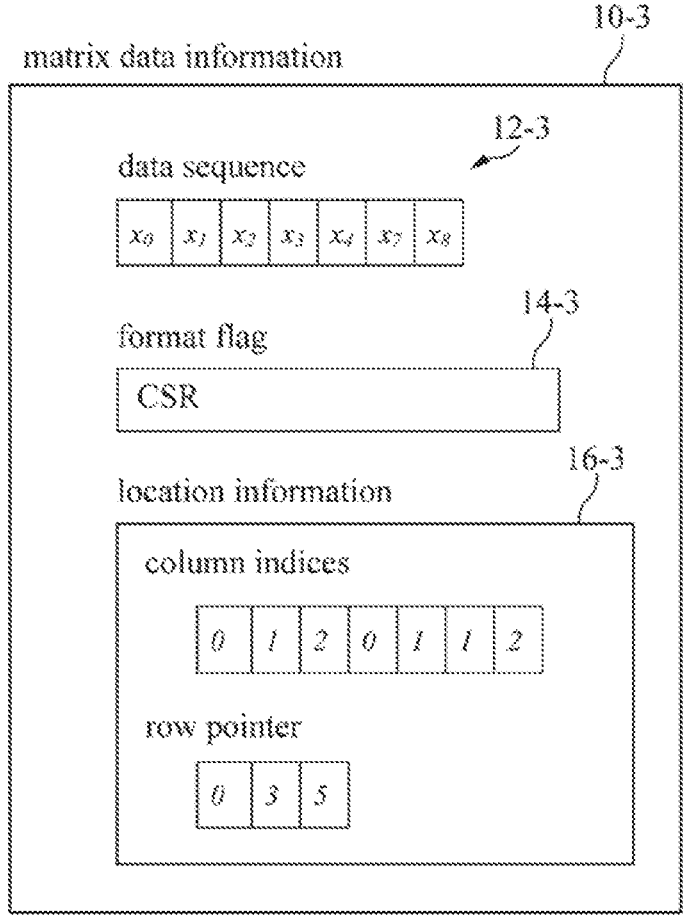
FIG. 3 illustrates the matrix data information representing the target matrix data in the CSR sparse representation format.

CSR, CSC, and COO are examples of sparse representation format. FIG. 3 illustrates the matrix data information representing the target matrix data in the CSR sparse representation format. The matrix data information 10-3 includes the data sequence 12-3, the format flag 14-3, and the location information 16-3. It is assumed that x5 and x6 are zero in FIG. 3. The data sequence 12-3 includes only non-zero data elements in row-major order, and does not include x5 and x6. The format flag 14-3 shows that the CSR sparse representation format is used. The location information 16-3 includes column indices corresponding to the non-zero data elements, and row pointer.

Figure 4:
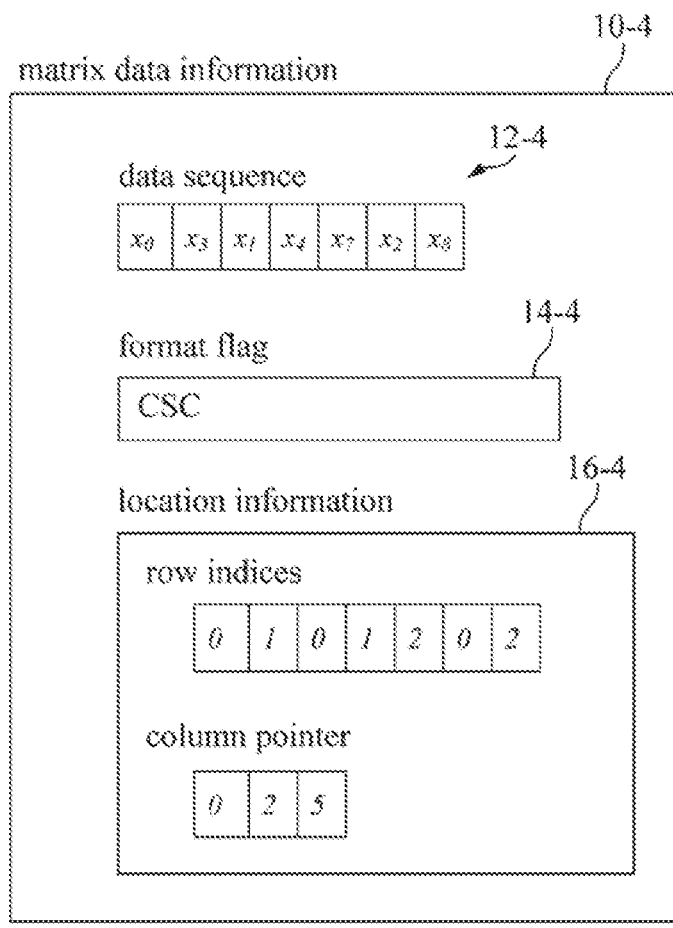
FIG. 4 illustrates the matrix data information representing the target matrix data in the CSC sparse representation format.

FIG. 4 illustrates the matrix data information representing the target matrix data in the CSC sparse representation format. The matrix data information 10-4 includes the data sequence 12-4, the format flag 14-4, and the location information 16-4. FIG. 4 also assumes that x5 and x6 are zero. The data sequence 12-4 includes only non-zero data elements in column-major order, and does not include x5 and x6. The format flag 14-4 shows that the CSC sparse representation format is used. The location information 16-4 includes row indices corresponding to the non-zero data elements, and column pointer.

Figure 5:
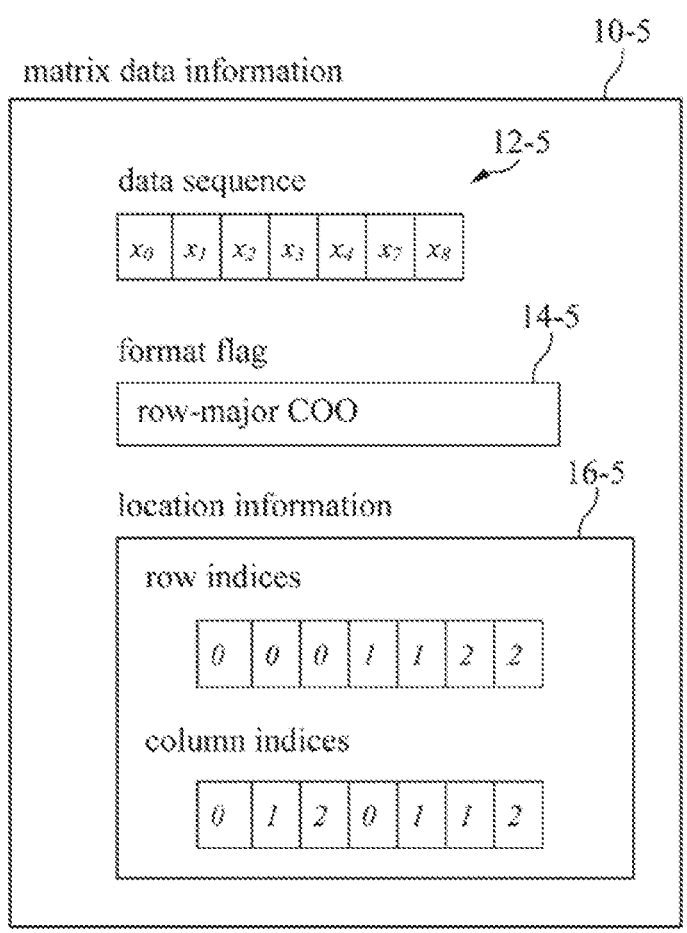
FIG. 5 illustrates the matrix data information representing the target matrix data in the row-major COO sparse representation format.
Figure 6:
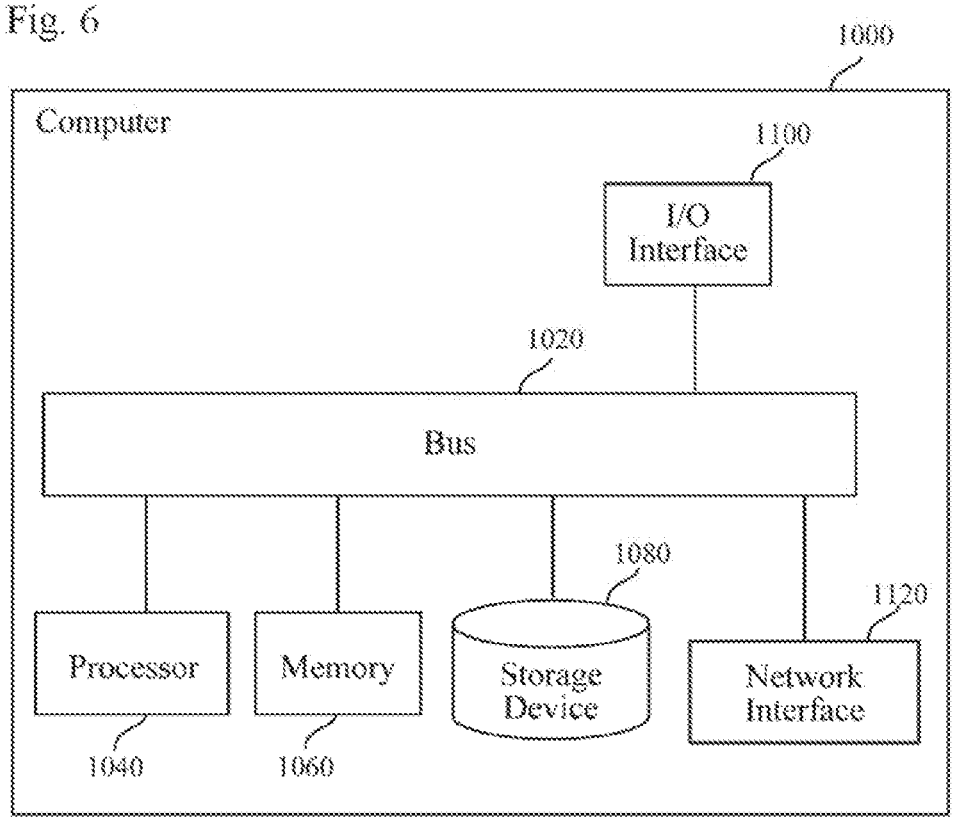
FIG. 6 illustrates a block diagram of a hardware configuration of the information processing apparatus in which the information processing apparatus is implemented by a combination of hardware elements and software elements.

FIG. 5 illustrates the matrix data information representing the target matrix data in the row-major COO sparse representation format. The matrix data information 10-5 includes the data sequence 12-5, the format flag 14-5, and the location information 16-5. FIG. 6 also assumes that x5 and x6 are zero. The data sequence 12-5 includes only non-zero data elements in row-major order, and does not include x5 and x6. The format flag 14-5 shows that the row-major COO sparse representation format is used. The location information 16-5 includes row indices and column indices corresponding to the non-zero data elements. Note that, the column-major COO can also be used.

The information processing apparatus 2000 acquires input matrix data information that represents the target matrix data in the dense representation format or a sparse representation format, calculates the sparsity of the target matrix data, selects a representation format to be used in output matrix data information, and outputs the output matrix data information that represents the target matrix data in the selected representation format. The representation format to be used in the output matrix data information is selected based on the sparsity of the target matrix data from one of the above-mentioned plurality of the representation formats, i.e. the dense representation format and at least two sparse representation formats.

In order to realize the above-mentioned operations, the information processing apparatus 2000 includes an acquisition unit 2020, a sparsity calculation unit 2040, a selection unit 2060, and an output unit 2080. The acquisition unit 2020 acquires the input matrix data information. The sparsity calculation unit 2040 calculates the sparsity of the target matrix data represented by the input matrix data information. The selection unit 2060 selects a representation format to be applied to the output matrix data information from the above-mentioned plurality of representation formats, based on the sparsity calculated by the sparsity calculation unit 2040. The output unit 2080 outputs the output matrix data information that represents the target matrix data in the representation format selected by the selection unit 2060.

Advantageous Effects

According to the present example embodiment of the information processing apparatus 2000, the representation format of the target matrix data is determined among the dense representation format and at least two sparse representation formats based on the sparsity of the matrix data. Thus, the sparsity of the matrix data is used not only for determining whether to use dense or sparse representation format, but also for which one of multiple sparse representation formats is to be used to represent the target matrix data. Therefore, unlike the technique disclosed by PTL1 that use the sparsity of matrix data merely for determining whether to use dense or sparse representation format, the information processing apparatus 2000 is able to effectively determine suitable representation format even for the target matrix data with moderate sparsity.

An example use of matrix data is to describe data in DNN. A typical DNN architecture for image recognition is a Deep Convolutional Neural Network (DCNN) as described in NPL2, and a DNN architecture for speech recognition is either a Deep Feed Forward Neural Network (DFF) or a Deep Recurrent Neural Network (DRNN) as described in NPL3 and NPL4, respectively. Generally, the output data from DNN is called feature or activation data, and are described with 1D vector, matrix, or n-dimensional array. If the activation data is the output from DCNN, then it is usually called feature map and is a matrix or multi-dimensional array. On the other hand, if the activation data is from DFF or DRNN, it is called feature and is a vector.

A DCNN consists of a stack of convolutional layers, activation layers, pooling layers, and fully-connected layers, which convolute the input feature maps with their kernels to extract features, transform the input feature with a non-linear function, downsample the input feature, and perform matrix multiplication in order to classify the input into a class, respectively. A DFF consists of a stack of fully-connected layers and activation layers. A DRNN consists of a stack of recurrent layers, which performs matrix multiplication of the past and present context, and activation layers. An activation layer generates non-uniform sparse matrix data by applying non-linear functions to the input. The non-linear functions may be sigmoid or Rectified Linear Unit (ReLU) function.

Since a large amount of matrix data is input and output in DNN, efficient representation of matrix data is quite important in terms of storage space, network bandwidth, and so on. Suitable selection of representation format of matrix data with the information processing apparatus of the present example embodiment is therefore useful in DNN.

Note that, DNN is merely an example of applications of the information processing apparatus 2000, and the information processing apparatus 2000 is applicable to a lot of other domains in which matrix data is used.

Hereinafter, the information processing apparatus 2000 of the present invention will be described in more detail.

<Example of Hardware Configuration>

Each functional component of the information processing apparatus 2000 may be implemented only by hardware elements that implement each functional component shown in FIG. 1 (for example, an hard-wired electronic circuit), or may be implemented by a combination of hardware elements and software elements (for example, a combination of electronic circuits and a program controlling the electronic circuits).

FIG. 6 illustrates a block diagram of a hardware configuration of the information processing apparatus 2000 in which the information processing apparatus 2000 is implemented by a combination of hardware elements and software elements. The information processing apparatus 2000 includes a bus 1020, a processor 1040, a memory 1060, a storage device 1080, an input-output interface 1100, and a network interface 1120. The bus 1020 is a data transmission channel through which the processor 1040, the memory 1060, the storage device 1080, the input-output interface 1100, and the network interface 1120 exchange data. Note that, a way of connecting the hardware elements with each other is not limited to bus connection.

The processor 1040 is an electronic circuitry that carries out instructions of a computer program, such as central processing unit (CPU) or graphics processing unit (GPU). In another example, the processor 1040 may be a specific circuit such as Application-Specific Integrated Circuit (ASIC), Application-Specific Instruction set Processor (ASIP), or reconfigurable devices such as Field Programmable Gate Array (FPGA). The memory 1060 is a primary storage device such as random access memory (RAM) or read only memory (ROM). The storage 1080 is a secondary storage device such as hard disk, solid state drive (SSD), or memory card. The input-output interface 1100 is an interface through which the information processing apparatus 2000 connects to peripheral devices, such as keyboard, display, and so on. The network interface 1120 is an interface through which the information processing apparatus connect to network, such as local area network (LAN), wide area network (WAN), and so on.

The storage device 1080 stores program modules with which the above-mentioned functional components of the information processing apparatus 2000 are realized. The processor 1040 loads the program modules into the memory 1060, and executes the loaded program modules.

<Flow of Processing>

Figure 7:
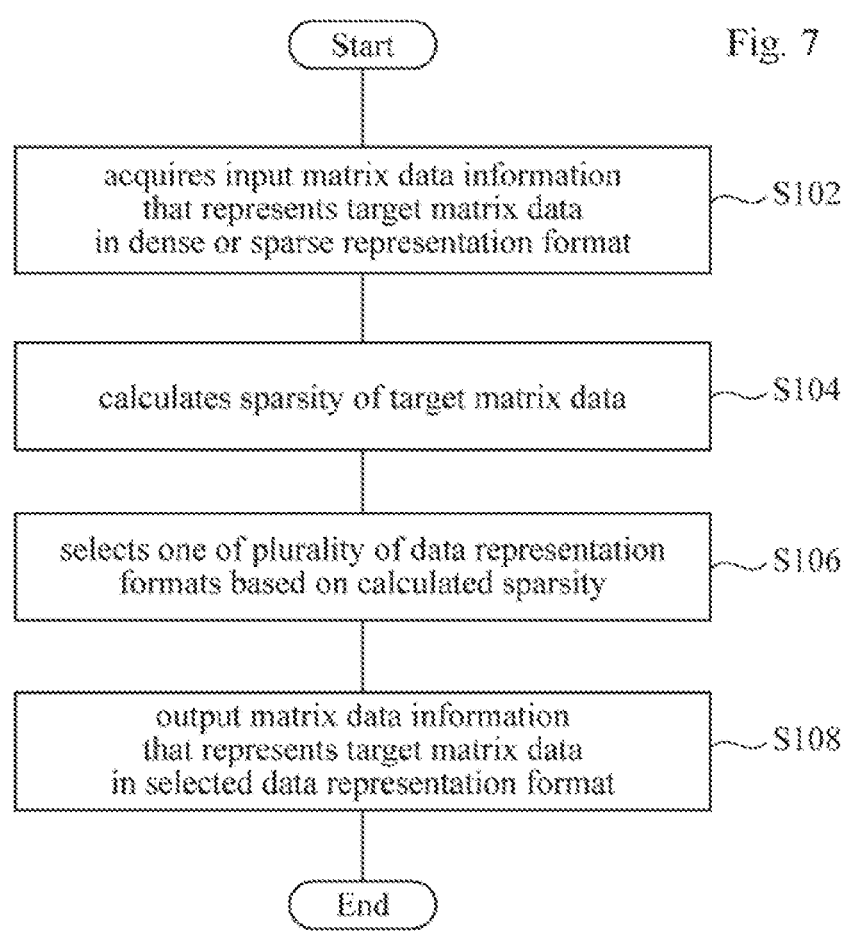
FIG. 7 illustrates a flowchart showing a flow of processes performed by the information processing apparatus of the first example embodiment.

FIG. 7 illustrates a flowchart showing a flow of processes performed by the information processing apparatus 2000 of the first example embodiment. The acquiring unit 2020 acquires the input matrix data information that represents the matrix data in the dense or a sparse representation format (S102). The sparsity calculation unit 2040 calculates the sparsity of the target matrix data (S104). The representation determination unit 2060 selects one of the plurality of representation formats based on the calculated sparsity (S106). The output unit 2080 outputs output matrix data information that represents the target matrix data in the selected representation format (S108).

<Acquisition of Matrix Data Information: S102>

The acquiring unit 2020 acquires the input matrix data information (S102). The input matrix data information can be acquired with various ways. For example, the input matrix data information may be stored in the storage device 1080 in advance. In this case, the acquiring unit 2020 acquires the input matrix data information from the storage device 1080. In another example, the input matrix data information may be input by a user of the information processing apparatus 2000 using an input device such as a keyboard or a touch panel. In another example, the acquiring unit 2020 may access to an external device, such as a server machine or network attached storage (NAS), that stores the input matrix data information, and acquire the input matrix data information from the external device. In another example, the acquiring unit 2020 may receive the input matrix data information transmitted by the external devices.

<Calculation of Sparsity of Matrix Data: S104>

The sparsity calculation unit 2040 calculates the sparsity of the target matrix data (S104). The sparsity of matrix data may be defined by the following equation.

$$S = \frac{n_{zero}}{n_{total}} \qquad \text{<Equation 1>}$$

S represents the sparsity of the matrix data. n_zero represents the number of zero-valued data elements of the matrix data. n_total represents the total number of data elements of the matrix data. By this definition, the larger the value of S is, the sparser the matrix is.

FIG. 8 illustrates three examples of matrix data: matrix data A, B, and C. As for the matrix data A, the number of zero-valued data elements and the number of total data elements are 2 and 25, respectively. Thus, the sparsity of the matrix data A is 0.08 (2/25). As for the matrix data B, the number of zero-valued data elements and the number of total data elements are 6 and 25, respectively. Thus, the sparsity of the matrix data B is 0.24 (6/25). As for the matrix data C, the number of zero-valued data elements and the number of total data elements are 48 and 49, respectively. Thus, the sparsity of the matrix data C is 0.98 (48/49).

The sparsity calculation unit 2040 calculates the sparsity of the target matrix data using the input matrix data information acquired by the acquisition unit 2020. For example, the sparsity calculation unit 2040 counts the number of zero-valued data elements and the number of non-zero data elements of the target matrix data, respectively. Next, the sparsity calculation unit 2040 calculates the total number of data elements of the matrix data by summing the number of zero-valued data elements and the number of non-zero data elements of the target matrix data. Then, the sparsity calculation unit 2040 calculates the sparsity S of the target matrix data by applying to Equation 1 the number of zero-valued data elements and the total number of data elements of the target matrix. Note that, how to recognize the number of non-zero data elements and the total number of data elements of matrix data is not limited to the above exemplified way, and various well-known techniques can be applied.

When the input matrix data information represents the target matrix data in a sparse representation format, the data sequence 12 indicated by the input matrix data information does not include zero-valued data elements. Thus, the sparsity calculation unit 2040 cannot count the zero-valued data elements only with the data sequence 12. In this case, for example, the sparsity calculation unit 2040 generates data sequence of the target matrix data represented in the dense representation format using the data sequence 12 and the location information 14 indicated by the input matrix data information. Then, the sparsity calculation unit 2040 counts the number of zero-valued data elements of the target matrix data using the generated data sequence.

In another example, the input matrix data information may indicate the number of non-zero data elements of the target matrix data or the total number of data elements of the target matrix data. With this configuration, the sparsity calculation unit 2040 can calculate the sparsity of the target matrix data without counting zero-valued data elements of the target matrix data.

<Selection of Representation Format: S106>

The format selection unit 2060 selects one of the plurality of representation formats based on the calculated sparsity (S106). Specifically, the format selection unit 2060 compares the calculated sparsity of the target matrix data with pre-determined thresholds, and selects the representation format based on the result of the comparison.

Figure 9:
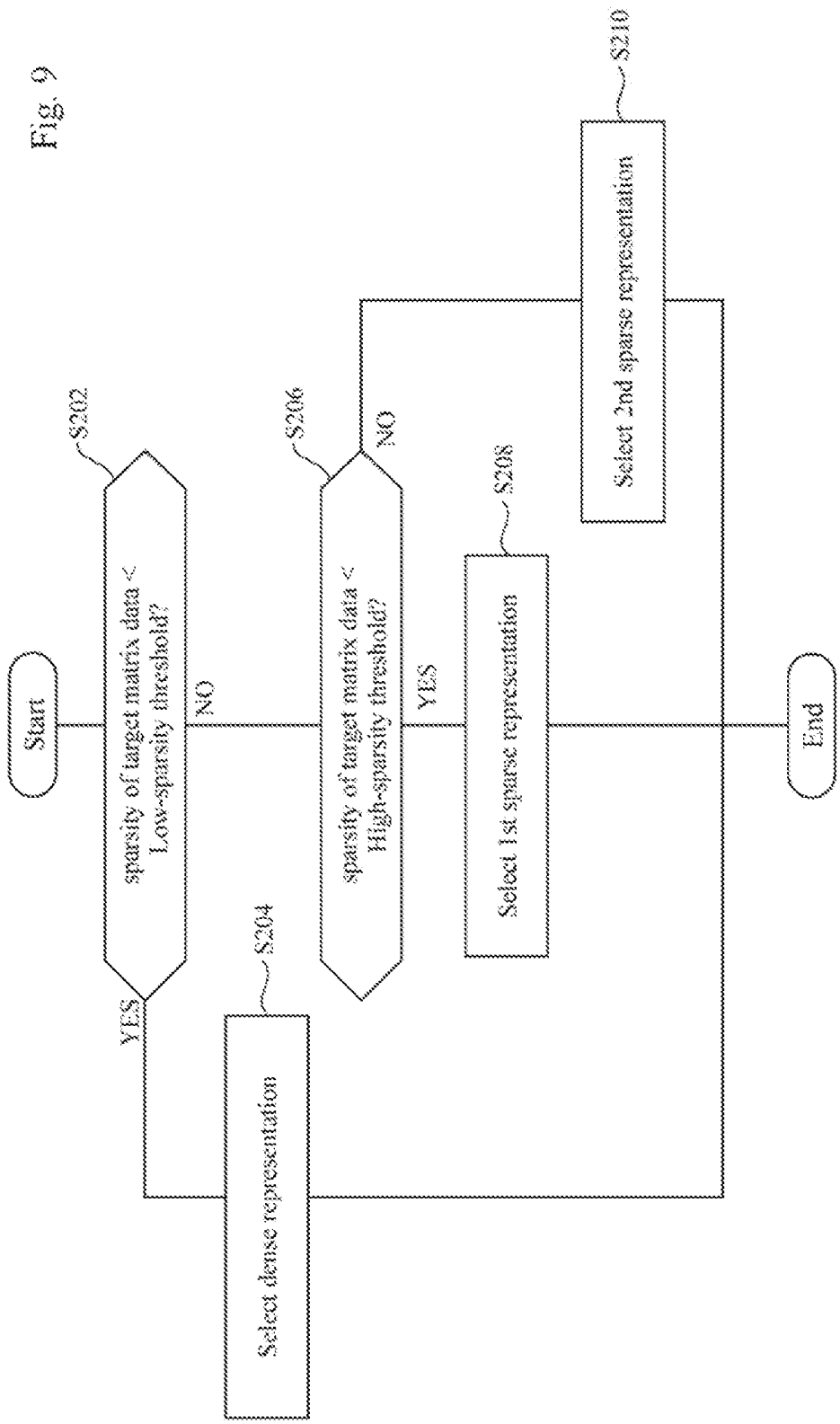
FIG. 9 illustrates an example flow of selecting a representation format.

FIG. 9 illustrates an example flow of selecting a representation format. In this example, there are two pre-determined thresholds: High-sparsity threshold and Low-sparsity threshold. High-sparsity threshold is greater than Low-sparsity threshold.

In the step 202, the format selection unit 2060 compares the calculated sparsity of the target matrix data with Low-sparsity threshold and determines whether or not the calculated sparsity of the target matrix data is smaller than Low-sparsity threshold. If it is determined the calculated sparsity of the target matrix data being smaller than Low-sparsity threshold (S202: YES), the format selection unit 2060 selects the dense representation format (S204).

On the other hand, if it is determined the calculated sparsity of the target matrix data not being smaller than Low-sparsity threshold (S202: NO), the format selection unit 2060 compares the calculated sparsity of the matrix data with High-sparsity threshold and determines whether or not the calculated sparsity of the target matrix data is smaller than High-sparsity threshold (S206). If it is determined the calculated sparsity of the target matrix data being smaller than High-sparsity threshold (S206: YES), the format selection unit 2060 selects the first sparsity representation format (S208). On the other hand, if it is determined the calculated sparsity of the target matrix data being not smaller than High-sparsity threshold (S206: NO), the format selection unit 2060 selects the second sparsity representation format (S210).

The first and second sparsity representation formats are different from each other in that the first sparsity representation format is suitable for matrix data with moderate sparsity, whereas the second sparsity representation format is suitable for that with high sparsity. Thus, the format selection unit 2060 selects the second representation format when the sparsity of the target matrix data is greater than High-sparsity threshold, whereas it selects the first representation format when the sparsity of the target matrix data is less than or equal to High-sparsity threshold.

An example of the first sparsity representation format is element-wise flag sparse representation format. The element-wise flag sparse representation format represents matrix data with non-zero data elements of the matrix data and Non-zero-element flags for each element of the matrix data, in either row-major or column-major order. Non-zero-element flags show whether or not the value of data elements is zero for each data elements of the matrix data. Hereinafter, the element-wise flag sparse representation format in which the non-zero data elements and Non-zero-element flags are described in row-major order is called "the row-major element-wise flag sparse representation format", whereas the element-wise flag sparse representation format in which the non-zero data elements and Non-zero-element flags are described in column-major order is called "the column-major element-wise flag sparse representation format".

Figure 10:
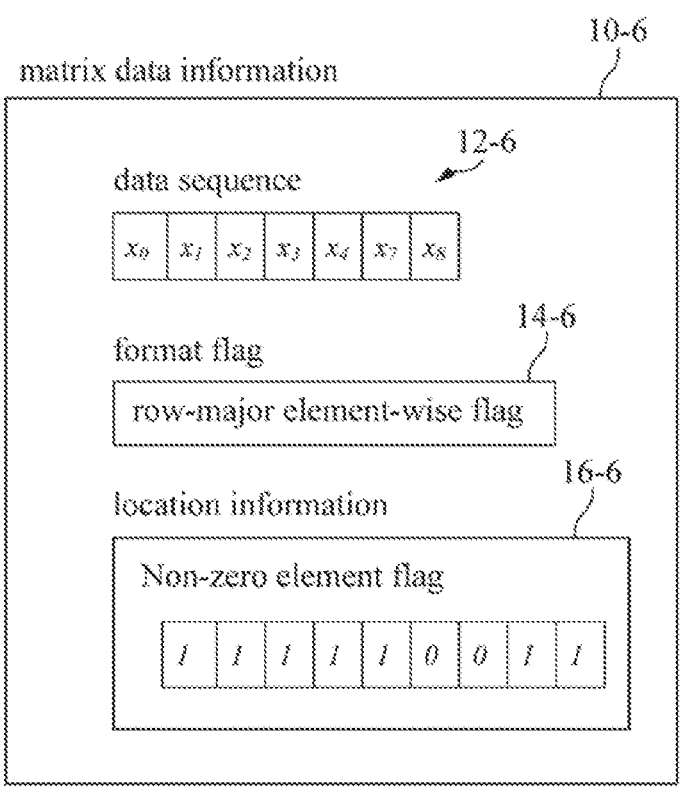
FIG. 10 illustrates an example of the matrix data information that represents the target matrix data in the row-major order element-wise flag sparse representation format.

FIG. 10 illustrates an example of the matrix data information that represents the target matrix data in the row-major order element-wise flag sparse representation format. The matrix data information 10-6 represents the matrix data A in the row-major order element-wise flag sparse representation format. In this example, it is assumed that x5 and x6 are zero.

The matrix data information 10-6 includes the data sequence 12-6, the format flag 14-6, and the location information 16-6. Since x5 and x6 are assumed to be zero, the data sequence 12-6 does not include x5 and x6, but include x0 to x4, x7, and x8 in row-major order. The format flag 14-6 indicates that the row-major order element-wise flag sparse representation format is used. The location information 16-6 includes Non-zero-element flags. Non-zero-element flags corresponding to x0 to x4, x7, and x8 indicate 1, whereas those corresponding to x5 and x6 indicate 0, in row-major order.

Figure 11:
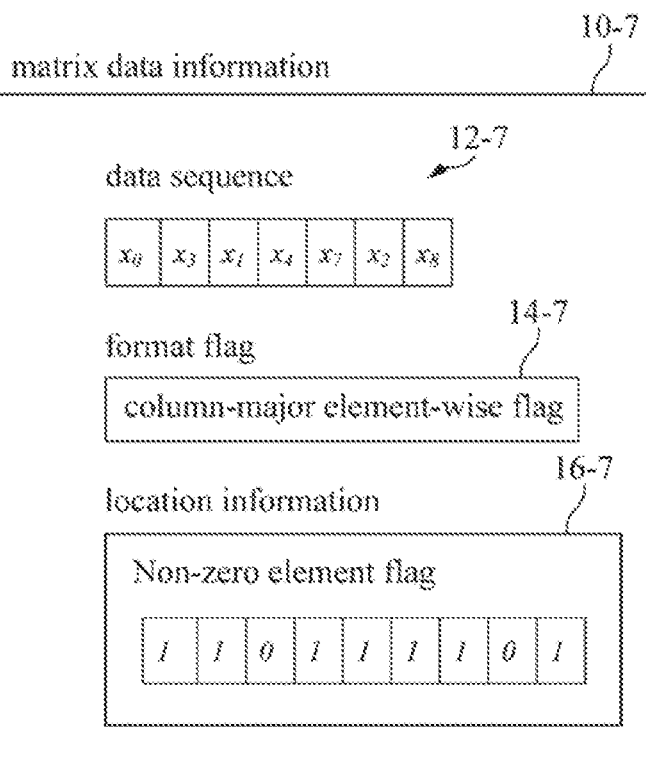
FIG. 11 illustrates an example of the matrix data information that represents matrix data in the column-major order element-wise flag sparse representation format.

FIG. 11 illustrates an example of the matrix data information that represents matrix data in the column-major order element-wise flag sparse representation format. Matrix data information 10-7 represents the matrix data A in the column-major order element-wise flag sparse representation format. Also in this example, it is assumed that x5 and x6 are zero.

As illustrated by FIG. 11, the data sequence 12-7 does not include x5 and x6, but include x0 to x4, x7, and x8 in column-major order. As for Non-zero-element flags (location information 14-7), those corresponding to x0 to x4, x7, and x8 indicate 1 whereas those corresponding to x5 and x6 indicate 0, in column-major order. The format flag 14-7 indicates that the column-major order element-wise flag sparse representation format is used.

The matrix data information representing the target matrix data in the element-wise flag sparse representation format can be generated from the input matrix data information by, for example, sequentially scanning each data element of the data sequence of the input matrix data information when the input matrix data information represents the target matrix data in the dense representation format. When the scanned data element is zero, the corresponding Non-zero-element flag is set as zero. On the other hand, when the scanned data element is not zero, the corresponding Non-zero-element flag is set as 1, and the scanned data element is added into the data sequence of the matrix data information representing the target matrix data in the element-wise flag sparse representation format. Note that, the data sequence of the input matrix data information is scanned in column-major order when using the column-major order element-wise flag sparse representation format, whereas the data sequence of the input matrix data information is scanned in row-major order when using the row-major order element-wise flag sparse representation format.

Note that, it is preferable that the sparsity calculation unit 2040 is configured to generate Non-zero-element flags when counting the number of zero-valued data elements and the number of non-zero data elements of the target matrix data since the sparsity calculation unit 2040 necessarily determines whether each data element of the target matrix data is zero or not. With this configuration, the output unit 2080 can use Non-zero-element flags generated by the sparsity calculation unit 2040 and does not need to generate them when it is determined that the element-wise flag sparse representation is used.

The second sparse representation format may be, for example, CSR, CSC, COO, BSR, or LOL. Note that, the first sparse representation format may also be one of the above four sparse representation format. For example, CSR and COO may be used as the first and the second sparse representation format, respectively.

Definition of High-sparsity threshold depends on which representation formats are used. For example, if the element-wise flag sparse representation format is used as the first sparse representation format and CSC is used as the second sparse representation format, High-sparsity threshold may be defined by the following Equation 2.

$$Th_1 = 1 - \frac{R - \log_2(C)}{R \times \log_2(R)} \qquad \text{<Equation 2>}$$

Th1 represents High-sparsity threshold. R represents the number of rows of the target matrix data. C represents the number of columns of the target matrix data.

As a concept, threshold values are derived from the comparison between representation formats in terms of the amount of data used to represent the target matrix data. In terms of the above exemplified case, the comparison between the number of bits used to represent the target matrix data in the element-wise flag sparse representation format and that in CSR is described as the following Equation 3. Th1 in Equation 2 is obtained by solving Equation 3 for S (Th1=S).

bits used to represent matrix in Element-wise flag≤#bits used in CSR $R \times C + (1-S) \times B \times R \times C \le (1-S) \times B \times R \times C + R \times \log(R) + (1-S) \times R \times C \times \log(C)$   <Equation 3>

B represents the number of bits used to represent each data element of the target matrix data. S represents the sparsity of the target matrix data.

In another example, if the element-wise flag sparse representation format is used as the first sparse representation format and CSR is used as the second sparse representation format, High-sparsity threshold may be defined by the following Equation 4.

$$Th_1 = 1 - \frac{C - \log_2(R)}{C \times \log_2(C)} \qquad \text{<Equation 4>}$$

On the other hand, if the element-wise flag sparse representation format is used as the first sparse representation format, Low-sparsity threshold may be defined by the following Equation 5.

$Th_2 = 1/B$   <Equation 5>

Th2 represents Low-sparsity threshold. B represents the number of bits used to represent each data element of the target matrix data.

Figure 12:
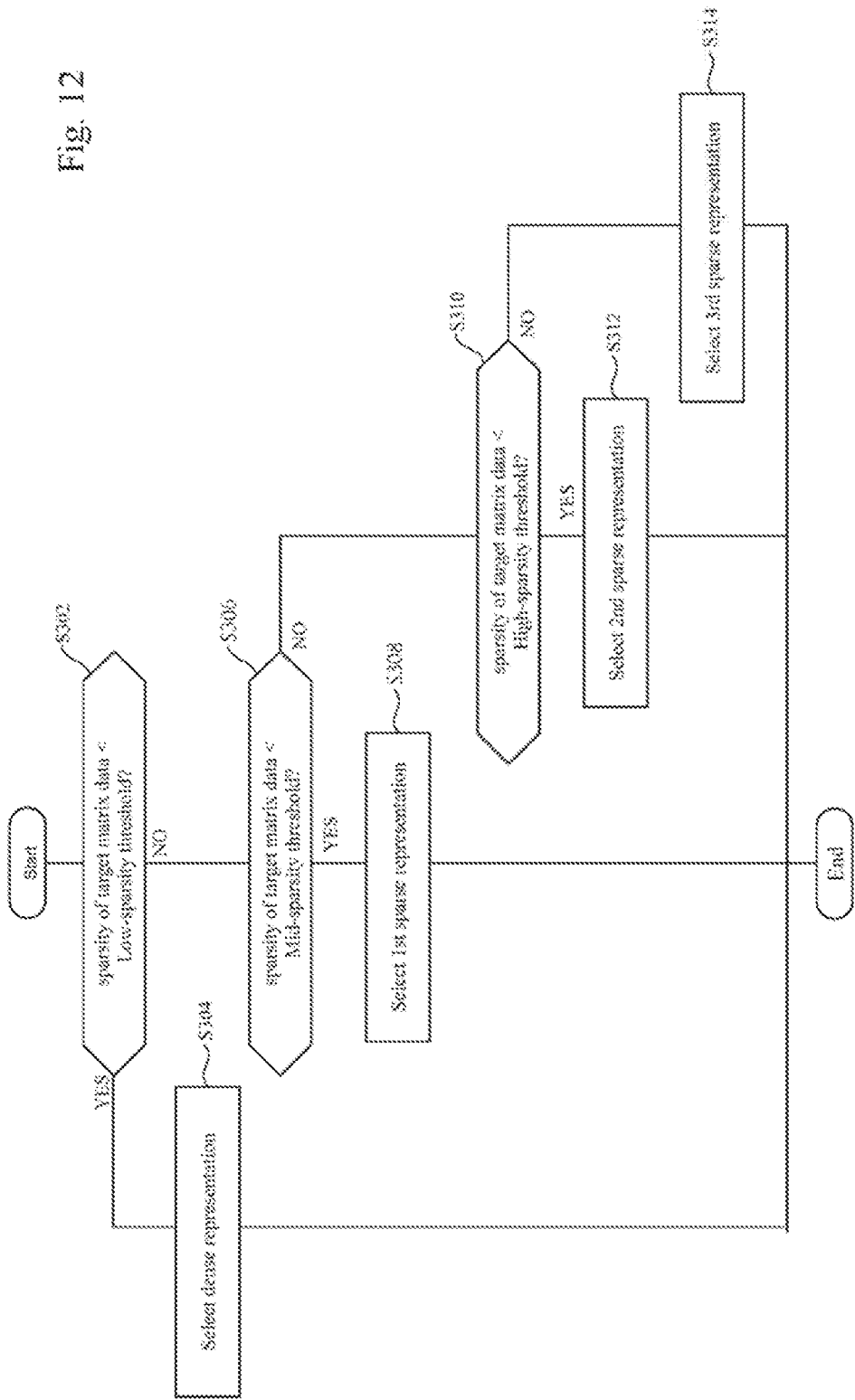
FIG. 12 illustrates another example of flow of selecting a representation format of the output matrix data information where there are three options of sparsity representation format.

The information processing apparatus 2000 may have three or more options of sparsity representation formats. FIG. 12 illustrates another example flow of selecting a representation format of the output matrix data information where there are three options of sparsity representation format. In this example, there are three pre-determined thresholds: High-sparsity threshold, Mid-sparsity threshold, and Low-sparsity threshold. Mid-sparsity threshold is lower than High-sparsity threshold and greater than Low-sparsity threshold.

In the step 302, the format selection unit 2060 determines whether or not the calculated sparsity of the target matrix data is smaller than Low-sparsity threshold. If it is determined the calculated sparsity of the target matrix data being smaller than Low-sparsity threshold (S302: YES), the format selection unit 2060 selects the dense representation format (S304).

On the other hand, if it is determined the calculated sparsity of the target matrix data not being smaller than Low-sparsity threshold (S302: NO), the format selection unit 2060 compares the calculated sparsity of the target matrix data with Mid-sparsity threshold and determines whether or not the calculated sparsity of the target matrix data is smaller than Mid-sparsity threshold (S306). If it is determined the calculated sparsity of the target matrix data being smaller than Mid-sparsity threshold (S306: YES), the format selection unit 2060 selects the 1st sparsity representation format (S308). If it is determined the calculated sparsity of the target matrix data not being smaller than Mid-sparsity threshold (S306: NO), the format selection unit 2060 determines whether or not the calculated sparsity of the target matrix data is smaller than High-sparsity threshold (S310). If it is determined the calculated sparsity of the target matrix data being smaller than High-sparsity threshold (S310: YES), the format selection unit 2060 selects the second sparsity representation format (S312). On the other hand, if it is determined the calculated sparsity of the target matrix data being not smaller than High-sparsity threshold (S310: NO), the format selection unit 2060 selects the third sparsity representation format (S314).

The first, second, and third sparsity representation formats may be, for example, element-wise flag sparse representation format, CSR, and COO, respectively. In this case, Mid-sparsity threshold and Low-sparsity threshold may be defined as Th1 in Equation 4 and Th2 in the Equation 5, respectively. In addition, High-sparsity threshold may be defined by the following equation.

$$Th_3 = \frac{C-1}{C} \qquad \text{<Equation 6>}$$

C represents the number of columns of the target matrix data.

<Output of Matrix Data Information: S108>

The output unit 2080 outputs the output matrix data information (S108). The output matrix data information is generated by the output unit 2080. For example, the output unit 2080 acquires the result of the selection performed by the selection unit 2060, and then generates the output matrix data information that represents the target matrix data in the representation format selected by the selection unit 2060.

In another example, the output unit 2080 may prepare the output matrix data information in parallel with the selection unit 2060 selecting the representation format of the output matrix data information. Specifically, the output unit 2080 may prepare all candidates of the output matrix data information each of which represents the target matrix data in different representation formats from each other. Suppose that element-wise flag sparse representation format, CSR, and COO are the options of sparse representation formats. In this case, the output unit 2080 prepares the output matrix data by generating three candidates of output matrix data information that represent the target matrix data in the element-wise flag sparse representation format, CSR, and COO respectively in parallel with the selection unit 2060 selecting the representation format of the output matrix data information.

After preparing the candidates of the output matrix data information, the output unit 2080 acquires the information that indicates the selected representation format from the selection unit 2060. The output unit 2080 then output one of the candidates of the output matrix data information the representation format of which matches the selected representation format, as the output matrix data information. Note that, if the representation format selected by the selection unit 2060 is the same as that used in the input matrix data information, the output unit 2080 may output the input matrix data information as the output matrix data information.

In another example, the preparation of candidates of the output matrix data information may be performed in parallel with the calculation of the sparsity of the target matrix data.

Figure 13:
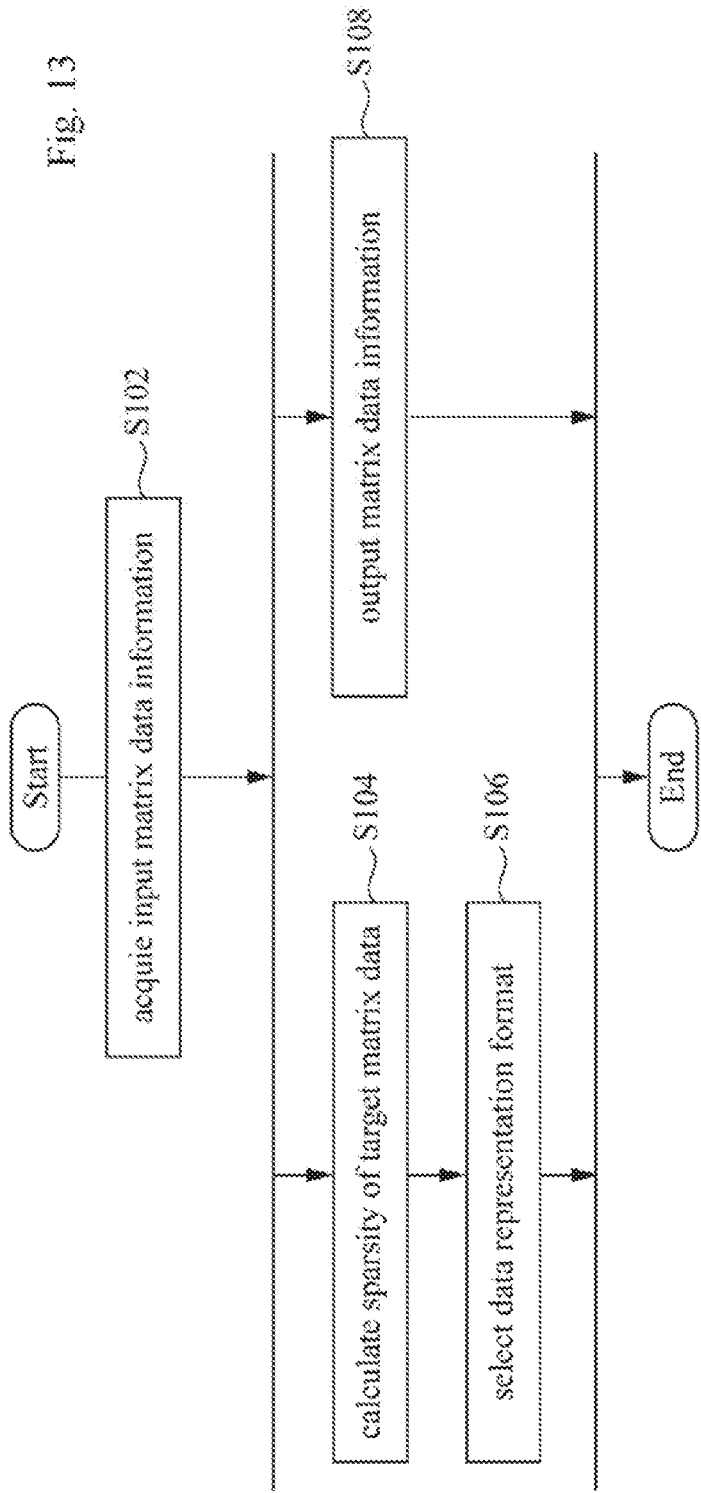
FIG. 13 illustrates a flowchart in which the output unit 2080 operates in parallel with the sparsity calculation unit 2040 and the selection unit 2060.

FIG. 13 illustrates a flowchart in which the output unit 2080 operates in parallel with the sparsity calculation unit 2040 and the selection unit 2060. Note that, the steps S102, S104, S106, and S108 are the same as those in FIG. 6, and they are performed by the acquisition unit 2020, the sparsity calculation unit 2040, the selection unit 2060, and the output unit 2080, respectively.

The input matrix data information is used to generate the output matrix data information. How to generate the output matrix data information from the input matrix data information depends on the representation format of the input matrix data information. When the target matrix data is represented in the dense representation format in the input matrix data information, the output unit 2080 generates the output matrix data information using the data sequence 12 that includes all data elements of the target matrix data. Note that, well-known techniques can be used to convert the format of the target matrix data from the dense representation format to a sparse representation format.

On the other hand, when the target matrix data is represented in a sparse representation format in the input matrix data information, the output unit 2080 generates the output matrix data information using the data sequence 12 that includes non-zero data elements and the location information 14. For example, the output unit 2080 retrieves all data elements of the target matrix data (converts the input matrix data information into the dense representation format) based on non-zero data elements and the location information, and converts the target matrix data (the retrieved data elements) from the dense representation format to the representation format selected by the selection unit 2060.

In another example, the output unit generates the output matrix data information by directly converting the input matrix data information into the representation format selected by the selection unit 2060. In this case, the output unit 2080 may include algorithms of converting the format of the target matrix data for each combination of the input format and the output format. Suppose that there are three choices of data representation formats that the selection unit 2060 can select: their names are f1, f2 and f3, respectively. In this case, the output unit 2080 may include algorithms of converting the format of the target matrix data from f1 to f2, from f1 to f3, from f2 to f1, from f2 to f3, from f3 to f1, and from f3 to f2.

The output matrix data information can be output to the inside or the outside of the information processing apparatus 2000 in various ways. For example, the output unit 2080 writes the output matrix data information into the memory 1060 or the storage device 1080. In another example, the output unit 2080 displays the output matrix data information on a display device that is connected with the information processing apparatus 2000 through the input-output interface 1100. In another example, the output 2080 transmits the output matrix data information to a server machine or a NAS through the network interface 1120.

Second Example Embodiment

Figure 14:
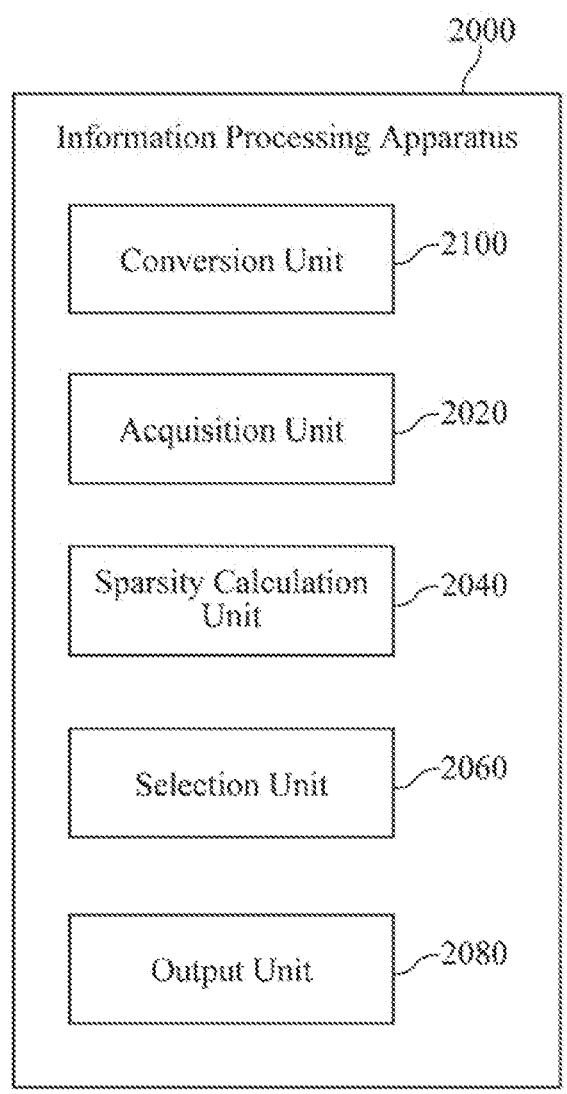
FIG. 14 illustrates the information processing apparatus of the second example embodiment.

FIG. 14 illustrates the information processing apparatus 2000 of the second example embodiment. Except for functions described below, the information processing apparatus 2000 of the present example embodiment has similar functions to those of the first example embodiment.

The information processing apparatus 2000 of the present invention accepts input data that is not described as matrix (2-dimensional array data), but as one-dimensional (1D) array or three-or-more-dimensional array. This input data is handled as one or more of matrix data, and each matrix data is processed as described in the first example embodiment.

In order to do so, the information processing apparatus 2000 includes a conversion unit 2100. The conversion unit 2100 acquires input data and converts it into one or more pieces of the input matrix data information.

When the input data is described as 1D array, the conversion unit 2100 equally divides the input data into a plurality of rows or a plurality of columns, and thereby generating the input matrix data information. The length of each row or the length of each column may be defined in advance.

Figure 15:
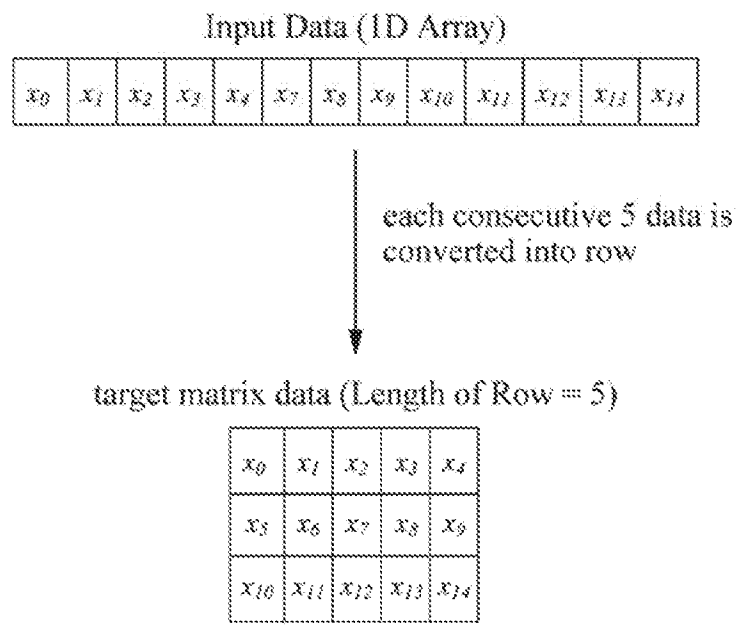

FIG. 15 illustrates how the conversion unit 2100 works when 1D array data is input. FIG. 15 supposes that the input data is described as 1D array. The input data includes 15 data elements (x0 to x14). The length of each row is defined as 5. In this case, the conversion unit 2100 equally divides the input data into three parts. Specifically, the sequence of x0 to x4 is converted into the first row, the sequence of x5 to x9 is converted into the second row, and the sequence of x10 to x14 is converted into the third row, respectively.

When the input data is described as 3-or-more dimensional array data, the conversion unit 2100 handles the input data as the collection of multiple matrix data. For example, 3D array data can be handled as a sequence of multiple matrix data. Thus, the conversion unit 2100 retrieves each matrix data included in the 3-or-more dimensional array data, and generates a plurality of input matrix data information each of which includes respective ones of the retrieved matrix data.

The format flag of the generated input matrix data indicates the representation format of the input data that the conversion unit 2100 acquires. For example, when the representation format of the input data is the dense representation format, the conversion unit 2100 generates one or more pieces of the input matrix data information each of which has the representation flag indicating the dense representation format.

Advantageous Effect

According to the present example embodiment of the information processing apparatus 2000, not only matrix data but also 1D array and 3-or-more dimensional array can be handled to convert their representation format into more effective one based on their sparsity.

APPENDICES

Hereinafter, examples of reference configurations will be described.

Appendix 1

An information processing apparatus comprising:
an acquiring unit acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
a sparsity calculation unit calculating sparsity of the target matrix data;
a selection unit selecting one of a plurality of representation formats based on the calculated sparsity, the plurality of representation formats including the dense representation format and at least two types of sparse representation formats; and an output unit outputting output matrix data information in which the target matrix data is represented in the selected representation format.

Appendix 2

The information processing apparatus according to appendix 1, wherein the selection unit performs:
determining whether or not the calculated sparsity is greater than low-sparsity threshold;
selecting the dense representation format when it is determined that the calculated sparsity is smaller than the low-sparsity threshold;
determining whether or not the calculated sparsity is smaller than high-sparsity threshold when it is determined that the calculated sparsity is not smaller than the low-sparsity threshold, the high-sparsity threshold being greater than the low-sparsity threshold;
selecting a first sparse representation format when it is determined that the calculated sparsity is smaller than the high-sparsity threshold; and
selecting a second sparse representation format when it is determined that the calculated sparsity is not smaller than the high-sparsity threshold.

Appendix 3

The information processing apparatus according to appendix 2, wherein the high-sparsity threshold is defined by comparing the number of bits used to represent the target matrix data in the first sparse representation format with the number of bits used to represent the target matrix data in the second sparse representation format, and wherein the low-sparsity threshold is defined by comparing the number of bits used to represent the target matrix data in the dense representation format with the number of bits used to represent the target matrix data in the first sparse representation format.

Appendix 4

The information processing apparatus according to appendix 3, wherein the high-sparsity threshold is defined by Equation 7 when the first sparse representation format is element-wise flag sparse representation format and the second sparse representation format is compressed sparse row, wherein Th1 represents the high-sparsity threshold, R represents a number of rows of the target matrix data, and C represents a number of columns of the target matrix data.

$$Th_1 = 1 - \frac{C - \log_2(R)}{C \times \log_2(C)} \qquad \text{<Equation 7>}$$

Appendix 5

The information processing apparatus according to appendix 3 or 4, wherein the low-sparsity threshold is defined by Equation 8 when the first sparse representation format is element-wise flag sparse representation format, wherein Th2 represents the low-sparsity threshold, B represents a number of bits used to represent each data element of the target matrix data.

$$Th_2 = 1/B \qquad \text{<Equation 8>}$$

Appendix 6

The information processing apparatus according to any one of appendices 1 to 5, further comprising a conversion unit that acquires one-dimensional array data, divides the one-dimensional array into a plurality of rows or columns, and generates the input matrix data information includes the plurality of rows or columns,
wherein the acquisition unit acquires the input matrix data generated by the conversion unit.

Appendix 7

The information processing apparatus according to any one of appendices 1 to 6, further comprising a conversion unit that acquires three-or-more-dimensional array data, retrieves a plurality of matrix data from the three-or-more-dimensional array data, and generates a plurality pieces of the input matrix data information each of which includes respective ones of the retrieved matrix data,
wherein the acquisition unit acquires the plurality pieces of the input matrix data information generated by the conversion unit.

Appendix 8

A control method to be performed by a computer, the method comprising:
acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
calculating sparsity of the target matrix data;
selecting one of a plurality of representation formats based on the calculated sparsity, the plurality of representation formats including the dense representation format and at least two types of sparse representation formats; and
outputting output matrix data information in which the target matrix data is represented by in the selected representation format.

Appendix 9

The control method according to appendix 7, wherein the selecting of the representation format includes:
determining whether or not the calculated sparsity is greater than low-sparsity threshold;
selecting the dense representation format when it is determined that the calculated sparsity is smaller than the low-sparsity threshold;
determining whether or not the calculated sparsity is smaller than high-sparsity threshold when it is determined that the calculated sparsity is not smaller than the low-sparsity threshold, the high-sparsity threshold being greater than the low-sparsity threshold;
selecting a first sparse representation format when it is determined that the calculated sparsity is smaller than the high-sparsity threshold; and
selecting a second sparse representation format when it is determined that the calculated sparsity is not smaller than the high-sparsity threshold.

Appendix 10

The control method according to appendix 9,
wherein the high-sparsity threshold is defined by comparing the number of bits used to represent the target matrix data in the first sparse representation format with the number of bits used to represent the target matrix data in the second sparse representation format, and
wherein the low-sparsity threshold is defined by comparing the number of bits used to represent the target matrix data in the dense representation format with the number of bits used to represent the target matrix data in the first sparse representation format.

Appendix 11

The control method according to appendix 10, wherein the high-sparsity threshold is defined by Equation 9 when the first sparse representation format is element-wise flag sparse representation format and the second representation format is compressed sparse row, wherein Th1 represents the high-sparsity threshold, R represents a number of rows of the target matrix data, and C represents a number of columns of the target matrix data.

$$Th_1 = 1 - \frac{C - \log_2(R)}{C \times \log_2(C)} \qquad \text{<Equation 9>}$$

Appendix 12

The control method according to appendix 10 or 11, wherein the low-sparsity threshold is defined by Equation 10 when the first sparse representation format is element-wise flag sparse representation format, wherein Th2 represents the low-sparsity threshold, B represents a number of bits used to represent each data element of the target matrix data.

$$Th_2 = 1/B \qquad \text{<Equation 10>}$$

Appendix 13

The control method according to any one of appendices 8 to 12, further comprising: acquiring one-dimensional array data; dividing the one-dimensional array into a plurality of rows or columns; and generating the input matrix data information includes the plurality of rows or columns, wherein the acquiring of the input matrix data information acquires the input matrix data information generated from the one-dimensional array data.

Appendix 14

The control method according to any one of appendices 8 to 13, further comprising: acquiring three-or-more-dimensional array data; retrieving a plurality of matrix data from the three-or-more-dimensional array data; and generating a plurality pieces of the input matrix data information each of which includes respective ones of the retrieved matrix data, wherein the acquiring of the input matrix data information acquires the input matrix data information generated from the three-or-more-dimensional array data.

Appendix 15

A program that causes a computer to execute:

acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;

calculating sparsity of the target matrix data;

selecting one of a plurality of representation formats based on the calculated sparsity, the plurality of representation formats including the dense representation format and at least two types of sparse representation formats; and outputting output matrix data information in which the target matrix data is represented by in the selected representation format.

Appendix 16

The program according to appendix 15, wherein the selecting of the representation format includes:

determining whether or not the calculated sparsity is smaller than low-sparsity threshold;

selecting the dense representation format when it is determined that the calculated sparsity is smaller than the low-sparsity threshold;

determining whether or not the calculated sparsity is smaller than high-sparsity threshold when it is determined that the calculated sparsity is not smaller than the low-sparsity threshold, the high-sparsity threshold being smaller than the low-sparsity threshold;

selecting a first sparse representation format when it is determined that the calculated sparsity is smaller than the high-sparsity threshold; and selecting a second sparse representation format when it is determined that the calculated sparsity is not smaller than the high-sparsity threshold.

Appendix 17

The program according to appendix 16, wherein the high-sparsity threshold is defined by comparing the number of bits used to represent the target matrix data in the first sparse representation format with the number of bits used to represent the target matrix data in the second sparse representation format, and wherein the low-sparsity threshold is defined by comparing the number of bits used to represent the target matrix data in the dense representation format with the number of bits used to represent the target matrix data in the first sparse representation format.

Appendix 18

The program according to appendix 17, wherein the high-sparsity threshold is defined by Equation 11 when the first sparse representation format is element-wise flag sparse representation format and the second sparse representation format is compressed sparse row, wherein Th1 represents the high-sparsity threshold, R represents a number of rows of the target matrix data, and C represents a number of columns of the target matrix data.

$$Th_1 = 1 - \frac{C - \log_2(R)}{C \times \log_2(C)} \qquad \text{<Equation 11>}$$

Appendix 19

The program according to appendix 17 or 18, wherein the low-sparsity threshold is defined by Equation 12 when the first sparse representation format is element-wise flag sparse representation format, wherein Th2 represents the low-sparsity threshold, B represents a number of bits used to represent each data element of the target matrix data.

$$Th_2 = 1/B \qquad \text{<Equation 12>}$$

Appendix 20

The program according to any one of appendices 15 to 19, causing the computer to further execute: acquiring one-dimensional array data; dividing the one-dimensional array into a plurality of rows or columns; and generating the input matrix data information includes the plurality of rows or columns, wherein the acquiring of the input matrix data information acquires the input matrix data information generated from the one-dimensional array data.

Appendix 21

The program according to any one of appendices 15 to 20, causing the computer to further execute: acquiring three-or-more-dimensional array data, retrieving a plurality of matrix data from the three-or-more-dimensional array data, and generating a plurality pieces of the input matrix data information each of which includes respective ones of the retrieved matrix data, wherein the acquiring of the input matrix data information acquires the input matrix data information generated from the three-or-more-dimensional array data.

What is claimed is:

1. An information processing apparatus comprising:
one or more processors; and
one or more memories storing program instructions executable by the one or more processors, wherein the one or more processors are configured to execute the program instructions to control:
an acquiring unit to acquire input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
a sparsity calculation unit to calculate sparsity of the target matrix data;
a selection unit to select one of a plurality of representation formats based on the calculated sparsity, the plurality of representation formats including the dense representation format and at least two types of sparse representation formats; and
an output unit to provide output matrix data information in which the target matrix data is represented in the selected representation format,
wherein the one or more processors are further configured to execute the program instructions to control the selection unit to:
determine whether or not the calculated sparsity is greater than low-sparsity threshold;
select the dense representation format when it is determined that the calculated sparsity is smaller than the low-sparsity threshold;
determine whether or not the calculated sparsity is smaller than high-sparsity threshold when it is determined that the calculated sparsity is not smaller than the low-sparsity threshold, the high-sparsity threshold being greater than the low-sparsity threshold;
select a first sparse representation format when it is determined that the calculated sparsity is smaller than the high-sparsity threshold; and
select a second sparse representation format when it is determined that the calculated sparsity is not smaller than the high-sparsity threshold,
wherein the high-sparsity threshold is defined by comparing the number of bits used to represent the target matrix data in the first sparse representation format with the number of bits used to represent the target matrix data in the second sparse representation format, and
wherein the low-sparsity threshold is defined by comparing the number of bits used to represent the target matrix data in the dense representation format with the number of bits used to represent the target matrix data in the first sparse representation format.

2. The information processing apparatus according to claim 1, wherein the high-sparsity threshold is defined by Equation 1 when the first sparse representation format is element-wise flag sparse representation format and the second sparse representation format is compressed sparse row, wherein Th1 represents the high-sparsity threshold, R represents a number of rows of the target matrix data, and C represents a number of columns of the target matrix data.

$$Th_1 = 1 - \frac{C - \log_2(R)}{C \times \log_2(C)}. \qquad \text{<Equation 1>}$$

3. The information processing apparatus according to claim 1, wherein the low-sparsity threshold is defined by Equation 2 when the first sparse representation format is element-wise flag sparse representation format, wherein Th2 represents the low-sparsity threshold, B represents a number of bits used to represent each data element of the target matrix data.

$$Th_2 = 1/B \qquad \text{<Equation 2>}$$

4. The information processing apparatus according to claim 1, wherein the one or more processors are further configured to execute the program instructions to control:
a conversion unit to acquire one-dimensional array data, divide the one-dimensional array into a plurality of rows or columns, and generate the input matrix data information includes the plurality of rows or columns; and
the acquiring unit to acquire the input matrix data generated by the conversion unit.

5. An information processing apparatus comprising:
one or more processors; and
one or more memories storing program instructions executable by the one or more processors, wherein the one or more processors are configured to execute the program instructions to control:
an acquiring unit to acquire input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
a sparsity calculation unit to calculate sparsity of the target matrix data;
a selection unit to select one of a plurality of representation formats based on the calculated sparsity, the plurality of representation formats including the dense representation format and at least two types of sparse representation formats;
an output unit to provide output matrix data information in which the target matrix data is represented in the selected representation format; and
a conversion unit that to acquire three-or-more-dimensional array data, retrieve a plurality of matrix data from the three-or-more-dimensional array data, and generate a plurality pieces of the input matrix data information each of which includes respective ones of the retrieved matrix data,
wherein the one or more processors are further configured to execute the program instructions to control the acquiring unit to acquire the plurality pieces of the input matrix data information generated by the conversion unit.

6. A computer-implemented control method comprising:
acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
calculating sparsity of the target matrix data;
selecting one of a plurality of representation formats based on the calculated sparsity, the plurality of representation formats including the dense representation format and at least two types of sparse representation formats;
outputting output matrix data information in which the target matrix data is represented by in the selected representation format;
determining whether or not the calculated sparsity is greater than low-sparsity threshold;
selecting the dense representation format when it is determined that the calculated sparsity is smaller than the low-sparsity threshold;
determining whether or not the calculated sparsity is smaller than high-sparsity threshold when it is determined that the calculated sparsity is not smaller than the low-sparsity threshold, the high-sparsity threshold being greater than the low-sparsity threshold;
selecting a first sparse representation format when it is determined that the calculated sparsity is smaller than the high-sparsity threshold; and
selecting a second sparse representation format when it is determined that the calculated sparsity is not smaller than the high-sparsity threshold,
wherein the high-sparsity threshold is defined by comparing the number of bits used to represent the target matrix data in the first sparse representation format with the number of bits used to represent the target matrix data in the second sparse representation format, and
wherein the low-sparsity threshold is defined by comparing the number of bits used to represent the target matrix data in the dense representation format with the number of bits used to represent the target matrix data in the first sparse representation format.

7. A non-transitory computer-readable medium storing a program that causes a computer to execute:
acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
calculating sparsity of the target matrix data;
selecting one of a plurality of representation formats based on the calculated sparsity, the plurality of representation formats including the dense representation format and at least two types of sparse representation formats; outputting output matrix data information in which the target matrix data is represented by in the selected representation format;
determining whether or not the calculated sparsity is greater than low-sparsity threshold;
selecting the dense representation format when it is determined that the calculated sparsity is smaller than the low-sparsity threshold;
determining whether or not the calculated sparsity is smaller than high-sparsity threshold when it is determined that the calculated sparsity is not smaller than the low-sparsity threshold, the high-sparsity threshold being greater than the low-sparsity threshold;
selecting a first sparse representation format when it is determined that the calculated sparsity is smaller than the high-sparsity threshold; and
selecting a second sparse representation format when it is determined that the calculated sparsity is not smaller than the high-sparsity threshold,
wherein the high-sparsity threshold is defined by comparing the number of bits used to represent the target matrix data in the first sparse representation format with the number of bits used to represent the target matrix data in the second sparse representation format, and
wherein the low-sparsity threshold is defined by comparing the number of bits used to represent the target matrix data in the dense representation format with the number of bits used to represent the target matrix data in the first sparse representation format.

8. A computer-implemented control method comprising:
acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
calculating sparsity of the target matrix data;
selecting one of a plurality of representation formats based on the calculated sparsity, the plurality of representation formats including the dense representation format and at least two types of sparse representation formats;
outputting output matrix data information in which the target matrix data is represented by in the selected representation format;
acquiring three-or-more-dimensional array data, retrieving a plurality of matrix data from the three-or-more-dimensional array data, and generating a plurality pieces of the input matrix data information each of which includes respective ones of the retrieved matrix data,
wherein, the acquiring of the input matrix data information acquired the input matrix data information generated from the three-or-more-dimensional array data.

9. A non-transitory computer-readable medium storing a program that causes a computer to execute:
acquiring input matrix data information that represents target matrix data in a dense representation format or a sparse representation format, the target matrix data being represented with all data elements of the target matrix data when the target matrix data is represented in the dense representation formats, the target matrix data being represented with non-zero data elements of the target matrix data when the target matrix data is represented in a sparse representation format;
calculating sparsity of the target matrix data;
selecting one of a plurality of representation formats based on the calculated sparsity, the plurality of representation formats including the dense representation format and at least two types of sparse representation formats;

outputting output matrix data information in which the target matrix data is represented by in the selected representation format;

acquiring three-or-more-dimensional array data, retrieving a plurality of matrix data from the three-or-more-dimensional array data, and generating a plurality pieces of the input matrix data information each of which includes respective ones of the retrieved matrix data, wherein, the acquiring of the input matrix data information acquired the input matrix data information generated from the three-or-more-dimensional array data.

* * * * *